United States Patent [19]

White

[11] 4,280,126
[45] Jul. 21, 1981

[54] LIQUID LEVEL DETECTOR

[75] Inventor: Kenneth T. White, Chicago Heights, Ill.

[73] Assignee: Chemetron Corporation, Chicago, Ill.

[21] Appl. No.: 39,047

[22] Filed: May 14, 1979

[51] Int. Cl.$^3$ .............................................. G08B 21/00
[52] U.S. Cl. ................................................... 340/621
[58] Field of Search ......... 340/621; 73/290 V, 290 R; 367/908

[56] References Cited

U.S. PATENT DOCUMENTS

| 2,932,818 | 4/1960 | Lubkin | 340/621 |
| 2,990,543 | 6/1961 | Rod | 340/621 |
| 3,017,771 | 1/1962 | Bonhomme | 340/621 |
| 3,019,650 | 7/1962 | Wonswick | 73/290 V |
| 3,079,596 | 2/1963 | Atkinson | 340/621 |
| 3,213,438 | 10/1965 | Felice et al. | 340/621 |
| 3,407,398 | 10/1968 | Stearn | 340/621 |
| 3,553,636 | 1/1971 | Baird | 340/621 |
| 3,603,149 | 9/1971 | McKown | 340/621 |
| 3,656,134 | 4/1972 | Brown | 340/621 |
| 3,719,939 | 3/1973 | Geil et al. | 340/621 |
| 3,944,994 | 3/1976 | Fanshawe | 340/621 |
| 4,123,753 | 10/1978 | Gravert | 340/621 |

FOREIGN PATENT DOCUMENTS 720970 11/1965 Canada ..................................... 340/621

Primary Examiner—Gerald L. Brigance
Attorney, Agent, or Firm—Vincent G. Gioia; William J. O'Rourke, Jr.

[57] ABSTRACT

An apparatus for locating the level of a liquid in a closed metallic container having curvilinear walls with a thickness of from ⅛ to ⅜ inch is disclosed comprising a manually portable transducer having a piezoelectric material for transmitting and receiving sonic waves, and a sonic pulse generator capable of exciting the piezoelectric material to emit sonic signals into the container from a location adjacent the outside wall of such container at a frequency within about 20% of the natural resinate frequency of the container. The apparatus further includes the electronic circuitry necessary for determining that the reception of the sonic signals transmitted into the container is in balance when the transducer is at a location away from the interface of the fluids within the container, and the electronic circuitry necessary for determining the precise vertical location at which the reception of sonic signals transmitted into the container is no longer balanced as the transducer is manually moved toward the interface of the fluids.

10 Claims, 4 Drawing Figures

LIQUID LEVEL DETECTOR

BRIEF SUMMARY OF THE INVENTION

The present invention relates to liquid level detector and more particularly to a detector for locating the level of a liquid in a closed metallic container having curvilinear walls with a thickness of from ⅛ to ⅜ inch such as pressurized steel containers housing fire suppression agents.

The chemical agents used in fire suppression systems throughout the various industries are stored in relatively large pressurized tanks. Such tanks must be periodically inspected to assure that the required amount of liquid chemical agent is present in the tank. The present inspection system requires that the tanks be disconnected from the fire suppression system and transported to a scale or weighing facility to be weighed. Disconnecting and transporting such tanks, which may be in excess of 400 pounds, is time consuming and burdensome. However, such inspection is necessary in order to assure that the fire suppression system is fully operational.

The National Fire Protection Association (NFPA) has established a standard which dictates that if a tank of liquid chemical fire suppressing agent deviates five or more percent from the required amount the tank is said to be empty. When a tank is initially filled with the chemical fire suppression agent it is immediately weighed and such weight is recorded on the cylinder. The periodic inspections which are conducted in substantially the same environment as the initial filled weighing is the procedure that is presently used to determine if a tank is empty. The present invention is directed to an ultrasonic detection device for locating the height of a liquid in such pressurized metallic containers without having to disconnect the tanks from a fire suppression system or move the tanks to a separate weighing facility.

Devices for detecting the level of a liquid inside a container have been disclosed in the prior art. For example, Stearn U.S. Pat. No. 3,407,398 teaches the use of an ultrasonic probe inside a tank which is being filled with petroleum. Such probe is used to indicate when the liquid level has reached a desired level.

Lubkin U.S. Pat. No. 2,932,818 discloses an apparatus for indicating the presence or absence of a liquid in a system. This apparatus operates by mounting a piezoelectric crystal inside a container or on a wall of a container or pipe in such system. The crystal is energized at a fixed frequency and when the material is removed from acoustic contact an indicator, such as a lamp, is activated by appropriate circuitry.

Bonhomme U.S. Pat. No. 3,017,771 discloses a liquid level indicator which is electrically controlled by a device which measures the vertical distance between the detector and the upper surface of a liquid inside a tank.

Worswick U.S. Pat. No. 3,019,650 pertains to an apparatus for detecting the presence or absence of a liquid inside a storage tank. A transducer is energized by an electrical oscillator which propagates ultrasonic energy into the tank. A receiver collects reflected ultrasonic energy and a signal is emitted in response to a change in the magnitude of the received energy. Atkinson U.S. Pat. No. 3,079,596 also relates to a level sensing system. In the operation of this system, a plurality of acoustical waves are transduced into various levels of a container. Differences in received acoustical waves are used to determine the level of material in the container. Baird U.S. Pat. No. 3,553,636 pertains to an ultrasonic detecting system capable of providing highly accurate measurements of viscosity variations of liquids enclosed in a container by a comparison technique. Fanshawe U.S. Pat. No. 3,944,994 and Gravert U.S. Pat. No. 4,123,753 disclose liquid level sensing devices which are immersed into the liquid during generation of ultrasonic energy.

The general concept of using ultrasound to indicate the presence or absence of a liquid in a container is known in the prior art. However, the majority of the prior art devices, recognizing the requirement that a transducer be in close electrical contact with the medium, require transducers and the like to be mounted onto a tank or inserted into a liquid inside such tank. Locating the level of a liquid in chemical fire suppression tanks or cylinders to within tight tolerances of less than ¼ inch and preferably to within less than ⅛ inch is complicated by the particular construction of such tanks. In particular, such tanks are closed or maintained under high pressure and have curvilinear walls all of which contribute to the increased generation of sonic noise during generation of ultrasonic waves. Such noise has a tendency to interfere with the reception of sonic waves in liquid level detecting devices. Additionally, such tanks have relatively thick metallic walls on the order of from ⅛ to ⅜ inch. The thickness of such walls has a tendency to interfere with the generation and reception of sonic waves in ultrasonic detecting devices.

Accordingly, a method and apparatus for precisely locating the level of a liquid in a closed metallic container having curvilinear walls with a thickness of from ⅛ to ⅜ inch is desired which would permit determination of the contents of such container without requiring disconnection, transporting, weighing and other auxiliary time consuming steps.

The present invention may be summarized as providing an apparatus for locating the level of a liquid in a closed metallic container having curvilinear walls with a thickness of from ⅛ to ⅜ inch comprising a manually portable transducer having a piezoelectric material for transmitting and receiving sonic waves, and a sonic pulse generator capable of exciting the piezoelectric material to emit sonic waves into a container from a location adjacent the outside wall of such container at a frequency within about 20% of the natural resonant frequency of the container. The apparatus further includes the electronic circuitry necessary to determine that the reception of the sonic waves transmitted into the container is in balance when the transducer is at a location away from the interface of the fluids within the container and the electronic circuitry necessary to determine the precise vertical location at which the reception of sonic waves transmitted into the container is no longer balanced as the transducer is manually moved toward the interface of the fluids.

Among the advantages of the present invention is the provision of a new and improved apparatus for locating the precise level of a liquid in a closed metallic container without requiring such container to be disconnected from the system, transported to a weighing facility and weighed to determine the amount of fluid present in such container.

Another advantage of the present invention is to provide an apparatus which is capable of precisely locating the level of liquid in a closed metallic container having curvilinear walls with a thickness of from 1/8 to 3/8 inch. An objective of the present invention is to provide an apparatus for locating the interface between fluids in a closed container to within close tolerances of less than 1/4 inch, and preferably to within less than 1/8 inch. Another advantage of the present invention is the provision of a liquid level detecting device which can accurately determine the level of a liquid in a closed container from a location along the external sidewall of the container without requiring any portion of the detecting device to be mounted onto the container or inserted into the container. The portability and accuracy of the detecting device of the present invention is considered a unique advantage.

These and other objectives and advantages of the present invention will be more fully understood and appreciated with reference to the following description and the accompanying drawings

DETAILED DESCRIPTION

Figure 1:
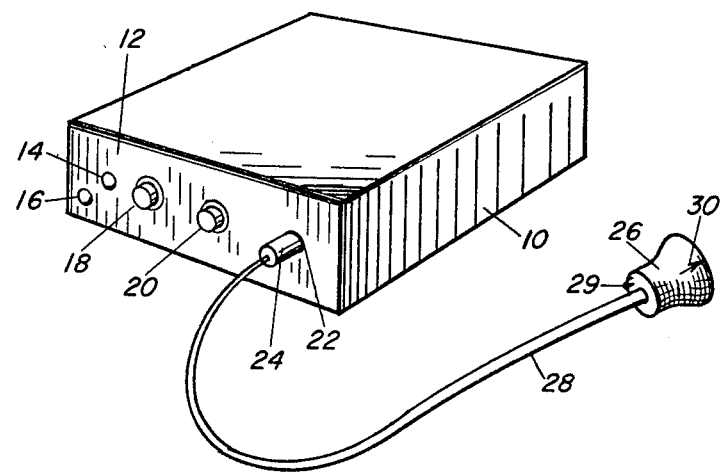
FIG. 1 is a perspective view of the liquid level detector of the present invention.

Referring particularly to the drawings, FIG. 1 illustrates a preferred liquid level detector of the present invention. The apparatus includes a housing 10 for the majority of the electronic circuitry necessary to perform the functions required by the apparatus. The housing 10, as shown in FIG. 1, may be generally rectangular having an operating panel on one face 12. The operating panel includes an on-off switch 14, an access plug 16 for electrical connection to an external charging unit, a gain dial 18, a selector dial 20 and an access plug 22 for connecting a transducer. As shown in FIG. 1, a connector 24 for the transducer is inserted into the access plug 22. A transducer head 26 is disposed at the end of a wire 28 extending from the connector 24.

Figure 2:
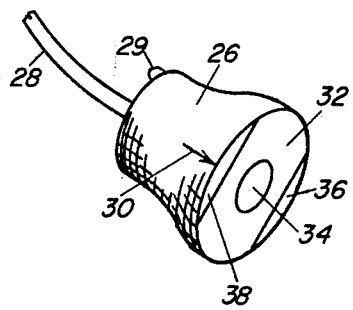
FIG. 2 is a perspective view of the transducer head 26 shown in FIG. 1.

As is better illustrated in FIG. 2, the transducer 34 is housed in a transducer head 26 or plug disposed at the end of the cord 28. The configuration of the head 26 should facilitate manual positioning thereof with the hands and fingers of the operator of the apparatus. The cord 28 should be long enough to provide for access to the tanks to be measured, and a three (3) foot long cord has been found to be adequate for most applications.

The transducer head 26 preferably includes an indicator 26, such as an LED lamp for ease in visual determination of the level of a liquid in the cylinder or tank being tested. It should be understood that various other indicators can be used including audio signals, or meters, and that the indicator may be incorporated into the operating panel, or into an external device such as a headphone for audio reception by the operator. In the preferred embodiment, however, the indicator is a lamp 25 incorporated into the transducer head 26.

The head 26 is provided with a body having an outside surface easily grasped with the fingers of the operator for manual adjustment thereof. The head 26 is further provided with a contact surface 32 adapted to be placed against the outside wall of a tank to be tested. The contact surface 32 may be flat or tapered. In fact, a variety of plugs may be employed having various surface contours for use with tanks of various types of outside wall contours especially including the various numbers of spherical and cylindrical tanks.

Substantially centrally located at or near the contact surface 32 of the transducer head 26 is the transducer itself 34. Preferably, the transducer 34 is held in position near the contact surface 32 with an epoxy material. As will be explained in more detail below, the contact surface 32 of the transducer head 26 may be provided with parallel disposed ridges 36 and 38 on the left and right extremities of the contact surface 32 respectively. A liquid level indication arrow 30 is also provided on the transducer head for a precise determination of the level of a liquid in a container during operation of the apparatus of the present invention.

The liquid level detector of the present invention may operate on a battery pack preferably contained in the housing 10. Typically, the device may include a pack of ten (10) nickel cadmium batteries able to provide an operating voltage of about 12 1/2 volts. Preferably, the batteries are rechargeable and may be appropriately recharged during periods of nonuse by appropriate electrical connection through a rechargeable access plug 16 provided on the operating panel of the housing 10 for the unit.

The transducer for the apparatus of the present invention consists of a piezoelectric material capable of transmitting and receiving ultrasonic waves. Typical piezoelectric materials include quartz, lead zirconate, barium titanate, or the like.

A transmitter must be provided in the unit to excite the piezoelectric material in the ultrasonic transducer in order to generate the ultrasonic signals necessary for the operation of the liquid level detector of the present invention. Since the piezoelectric material in the transducer of the present invention is used to generate as well as to receive signals, the transmitter of the present apparatus is preferably a pulse generator. A pulse generator is capable of exciting the piezoelectric material in the transducer for very short repetitious time periods, i.e., microseconds, which permits the piezoelectric material to be utilized as a receiver during the periods in which pulses are not being generated.

Accurate detection of the height of a liquid chemical fire suppression agent inside a closed thick walled cylindrical or spherical tank has not been accomplished with sonic detection equipment. Common obstacles to the use of sonic detection equipment in determining the amount of chemical fire suppression agents in a closed cylindrical cylinder include the presence of curvilinear walls which increases the amount of noise which is generated in the system, the thickness of the walls of the container which tend to hamper sonic signal emission and reception, and the density of the pressurized materials contained within the tank. It has been found, however, by the inventors of the present invention that sonic detection of the level of liquid in a closed metallic container may be accurately conducted provided that the ultrasonic transducer is excited at a frequency approximating the natural resinate frequency of the tank wall. Every physical system has one or more natural vibration frequencies. If such a system is given impulses with arbitrary frequency the system will vibrate with that frequency. These are forced vibrations because they are other than the natural frequency. If the impressed or arbitrary frequency is varied, the response becomes more vigorous as a natural frequency is approached. As the natural resinate frequency is approached, the amplitude increases many fold as exact synchronism is reached.

Conventional ultrasonic transducers are excited at a frequency of approximately 2¼ MHz. If such a high frequency were used in an attempt to locate the level of a liquid in a closed metallic container having thick curvilinear walls, such a detector would not operate. Emitting such a high frequency into a closed curvilinear walled tank would cause the sound to scatter obliquely throughout the tank. The scattered sound at such high frequency cannot be filtered adequately. In the liquid level detector of the present invention it has been found that relatively lower frequency transducers may be used to accurately locate the level of a liquid in such tanks or cylinders. It has been found that in the accurate location of the level of the liquid in such containers, the transducer must operate within 20% of the natural resinate frequency of the tank wall. For example, a 415 pound capacity Safety First model 400A type tank containing liquid Halon 1301 at a pressure of 360 psig has a natural resinate frequency approximating 450 KHz. To accurately locate the level of the liquid Halon 1301 in such tank the ultrasonic transducer must be excited at a frequency within the range of about 350 to 550 KHz.

In the operation of the apparatus of the present invention, the pulse generator repetitiously excites the transducer. Typically, the transducer is excited for only a few microseconds, and the generation cycle of ultrasonic waves is periodically repeated, such as every 60 microseconds. In each 60 microsecond cycle, there would be about 40 microseconds in which the piezoelectric material in the transducer is not being used to emit ultrasound, and can be used to receive reflected ultrasonic signals. Reception of reflected sonic signals is conducted in a time and amplitude frame commonly called a window. The time frame in which the window is open, or capable of receiving sonic waves may be adjusted by a selector dial 20 provided in the unit. The minimum amplitude of received ultrasonic signals may also be adjusted by a gain dial 18 provided in the unit. The purpose of the gain dial 18 is to raise the amplitude at which reception of ultrasonic signals occurs. This gain control prevents lower amplitude noise and other scattered sounds from interfering with reception of ultrasonic waves.

In the operation of the liquid level detector of the present invention, the apparatus is carried to a location where a series of high pressure tanks containing chemical fire suppression agents are installed in an overall fire suppression system. A particular advantage of the detector of the present invention is that it is light weight, approximately 5 pounds and therefore is highly mobile. To facilitate the transporting of the detector, the housing of the apparatus is typically inserted into a carrying case or holder. The case may be carried around the neck of the operator or mounted to the belt of the operator for ease of operation.

Figure 3:
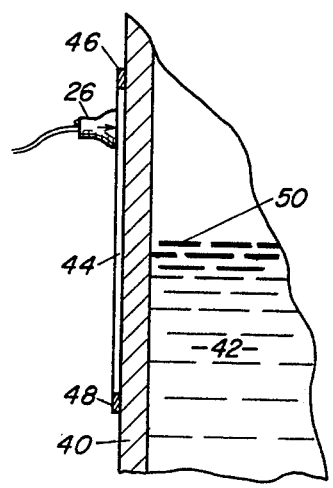
FIG. 3 is a side elevation view partially in cross section showing the transducer head in an operating position against the sidewall of a closed metallic container having a liquid therein.

In order to accurately determine the level of a liquid in such tank, the detector is energized and the contact surface 32 of the transducer head 26 is placed into contact with the outside wall 40 of a tank containing a liquid fire suppression agent 42 therein. The initial placement of the contact surface 32 of the transducer head 26 is at a location away from the interface 50 of the liquid and gas within the tank. As shown in FIG. 3, the transducer is placed on the outside wall 40 of the tank at a location above the interface 50 of the gas and liquid inside the tank. It should be understood by those skilled in the art that the initial placement of the transducer may be at a location below the interface. It will also be understood by those skilled in the art that determination of a location away from the interface is a relatively simple maneuver since the approximate location of the interface can be determined by a skilled operator in a relatively short period of time.

Figure 4:
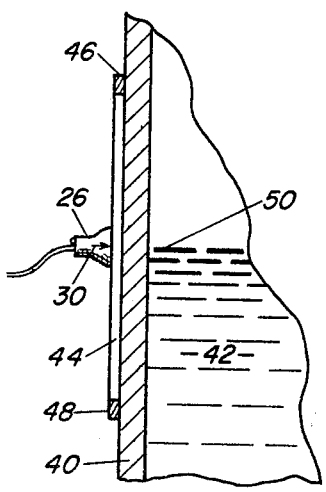
FIG. 4 is a side elevation view partially in cross section of the transducer head in an operating position along the outside wall of a cylinder containing a liquid therein at the precise location of the liquid level.

In a preferred embodiment as illustrated in FIGS. 3 and 4, a scanning strip 44 preferably made of plastic, and generally rectangular in configuration may be placed along the vertical axis of the tank. The scanning strip may be provided with holding means at the ends thereof such as the magnets 46 and 48 attached to the upper and lower extremities of the scanning strip 44 respectively. Such holding magnets assure that the scanning strip remains in place during the location of the liquid level with the apparatus of the present invention. In a preferred embodiment, the width of the scanning strip 44 matches the transverse width of the contact surface 32 between the parallel ridges 36 and 38. This preferred construction enables the transducer head to be pressed firmly against the scanning strip and easily moved therealong in a vertical direction by the guiding relationship between the ridges 36 and 38 and the scanning strip 44. Use of such scanning strip has been found to provide a better sonic communication between the transducer and the tank. This is especially true in instances wherein the tank wall is provided with a generally rough outside surface. To further increase the sonic contact between the transducer and the tank, a couplant such as a gel may be applied between the scanning strip 44 and the tank wall 40 as well as between the scanning strip 44 and the contact surface 32 of the transducer head 26. The use of a couplant has been found to increase the efficiency for the ultrasonic transmission and reception.

In an alternative embodiment, the scanning strip may be tapered to match the contour of the tank being tested. Such alternative may have particular advantages in testing for the level of a liquid in a spherical tank or cylinder.

With the transducer in position away from the interface 50, such as that shown in FIG. 3, the time frame in which the window is open, or capable of receiving sonic signals is adjusted with the selector dial 20 on the operating panel 12 of the unit. With the appropriate time frame selected, the gain dial 18 is adjusted to raise the amplitude at which reception of reflected ultrasonic signals occurs. The amount of scattered sounds and other noise may vary from tank to tank. Therefore, the adjustment of the gain dial 18 may be necessary with each detection test conducted.

When the reception time frame and minimum amplitude have been appropriately adjusted such that reflected ultrasonic signals are harmonically being received by the transducer the indicator 29 is activated by appropriate electronic circuitry. When the indicator 29 is activated the reception of sonic signals transmitted into the tank or cylinder is said to be in balance.

When the ultrasonic system is in balance the indicator light 29 will remain on. As mentioned earlier, it is a relatively simple process to identify the approximate location of the interface between the liquid and the gas inside the tank. Therefore, to check that the ultrasonic system is in balance the transducer can be moved to a position which is vertically below the interface 50 at which location the indicator light should go off. With the apparatus of the present invention, the precise location of the interface can be determined. This is done by slowly moving the transducer head with the system in balance and the indicator light on toward the interface 50 until the indicator light is extinguished. At the precise location where the indicator lamp extinguishes the level indicating arrow 30 on the transducer head 26 points to the exact location of the interface 50. The accuracy of location of the level indicating arrow 30 has been found to be within a $\frac{1}{4}$ of an inch and usually within $\frac{1}{8}$ of an inch by the apparatus of the present invention. Ideally, the actual interface, or liquid level, of each cylinder shall be marked on the outside wall of the cylinder when the cylinder is initially filled with the liquid chemical fire suppression agent. The liquid level detector of the present invention is used to locate the actual level of the liquid in the tank after the tank has been installed into an overall fire suppression system. By comparing the actual detected level with the initial level of the liquid which is marked on the outside of the tank during initial filling of the tank, the difference or volume change of liquid in the cylinder can be calculated based on the inside diameter of the cylinder the change in initial versus actual level and the density of the liquid chemical fire suppression agent. By using the liquid level detector of the present invention, variations in cylinder content equal to or greater than 5% of the initially filled content may be readily determined. As mentioned above, if a tank or cylinder varies 5% or more from the initially filled amount of liquid chemical fire suppression agent which is determined to be necessary in any particular system, such tank is deemed empty according to the standards set forth by the National Fire Protection Association (NFPA).

Typical chemical fire suppression agents which may be tested with the apparatus of the present invention include Halon 1301, Halon 1211, Freon 12 and liquid carbon dioxide.

What is believed to be the best mode of this invention has been described above. It will be apparent to those skilled in the art that numerous variations of the illustrated details may be made without departing from this invention.

What is claimed is:

1. An apparatus for locating the level of interface of two fluids in a closed metallic container having curvilinear walls with a thickness of from $\frac{1}{8}$ to $\frac{3}{8}$ inch comprising:
    a manually portable transducer having a piezoelectric material for transmitting and receiving sonic signals,
    a sonic pulse generator capable of exciting the piezoelectric material to emit sonic waves into the container wall from a location adjacent the outside surface of the container wall at a frequency within about 20% of the natural resonant frequency of the container wall,
    means for determining that the reception of the sonic signals transmitted into the container wall is above a minimum preselected amplitude when the transducer is at a location above the interface of the fluids within the container, and
    means for determining the vertical location at which the reception of sonic signals transmitted into the container wall is below the minimum preselected amplitude as the transducer is manually moved toward the interface of the fluids.

2. An apparatus as set forth in claim 1 further comprising a scanning strip for disposition between the outside surface of the container wall and the transducer.

3. An apparatus as set forth in claim 2 further comprising a couplant for disposition between the transducer and the scanning strip and between the scanning strip and the outside surface of the container.

4. An apparatus as set forth in claim 3 wherein the couplant comprises a gel.

5. A method for locating the level of a fluid in a closed metallic container having curvilinear walls with a thickness of from $\frac{1}{8}$ to $\frac{3}{8}$ inch comprising the steps of:
    placing a portable transducer, having a piezoelectric material for transmitting and receiving ultrasonic signals, into contact with an outside surface of the container wall at a location above the level of the fluid within the container,
    energizing the transducer to transmit a repetitious ultrasonic signal into the container wall at a frequency within 20% of the natural resonant frequency of the container wall, and to receive ultrasonic signals between repetitious transmissions,
    selecting a minimum amplitude at which the ultrasonic signals are received when the transducer is at a location above the level of the fluid within the container,
    manually moving the transducer along the outside surface of the container wall toward the level of the liquid within the container, and
    determining the first location at which the reception of ultrasonic signals is below the minimum selected amplitude indicating the location of the fluid level within the container.

6. A method as set forth in claim 5 further including the step of placing a scanning strip between the outside surface of the container wall and the transducer.

7. A method as set forth in claim 5 further including the step of placing a couplant between the transducer and the scanning strip and between the scanning strip and the outside surface of the container.

8. A method as set forth in claim 7 wherein the couplant is a gel.

9. An apparatus for locating the level of a liquid chemical fire suppression agent selected from the group consisting of Halon 1301, Halon 1211, Freon 12 and liquid carbon dioxide in a closed metallic container, pressurized in excess of 300 psig, having curvilinear walls with a thickness of from $\frac{1}{8}$ to $\frac{3}{8}$ inch comprising:
    a manually portable transducer having a piezoelectric material for transmitting and receiving sonic signals,
    a sonic pulse generator capable of exciting the piezoelectric material to emit sonic waves into the container wall, from a location adjacent the outside surface of the container wall, at a frequency of from about 350 to 550 KHz,
    a scanning strip for disposition between the outside surface of the container wall and the transducer,
    a couplant for disposition between the transducer and the scanning strip and between the scanning strip and the outside surface of the container wall, and a lamp having means for lighting as the reception of the sonic signals transmitted into the container wall is above a minimum preselected amplitude, when the transducer is at a location above the level of the liquid within the container, and said lamp having means for extinguishing as the reception of the sonic signals transmitted into the container wall is below the minimum preselected amplitude, occurring as the transducer is manually moved from the location above the level of the liquid to the vertical location on the container wall corresponding to the level of the liquid therein.

10. A method for locating the level of a liquid chemical fire suppression agent selected from the group consisting of Halon 1301, Halon 1211, Freon 12 and liquid carbon dioxide in a closed metallic container, pressurized in excess of 300 psig, having curvilinear walls with a thickness of from ⅛ to ⅜ inch, comprising the steps of:

placing a manually portable transducer, having a piezoelectric material for transmitting and receiving ultrasonic signals, into contact with a scanning strip disposed against an outside surface of the container wall, at a location above the level of the liquid within the container, energizing the transducer to transmit a repetitious ultrasonic signal into the container wall at a frequency of from about 350 to 550 KHz, selecting a minimum amplitude at which the received ultrasonic signals activate a lamp when the transducer is at a location above the level of the liquid within the container, and manually moving the transducer along the scanning strip toward the level of the liquid within the container to the first location at which the received ultrasonic signals are below the selected mimimum amplitude indicated by extinguishment of said lamp, indicating the location of the liquid level within the container.

* * * * *